United States Patent
O'Brien et al.

(10) Patent No.: US 10,674,459 B2
(45) Date of Patent: Jun. 2, 2020

(54) METHOD OF OPERATING A RECEIVER TO PROCESS A PREAMBLE OF A DATA PACKET, AND TO A RECEIVER OPERATING IN ACCORDANCE WITH THE METHOD

(71) Applicant: Analog Devices Global, Hamilton (BM)

(72) Inventors: Michael O'Brien, Munster (IE); Sean Francis Sexton, Cork (IE); Joshua Nekl, County Cork (IE); Dermot G. O'Keeffe, County Cork (IE)

(73) Assignee: Analog Devices Global, Hamilton (BM)

( * ) Notice: Subject to any disclaimer, the term of this patent is extended or adjusted under 35 U.S.C. 154(b) by 0 days.

(21) Appl. No.: 15/455,556

(22) Filed: Mar. 10, 2017

(65) Prior Publication Data

US 2018/0263001 A1    Sep. 13, 2018

(51) Int. Cl.
| | |
|---|---|
| *H04W 52/52* | (2009.01) |
| *H04B 1/00* | (2006.01) |
| *H04B 1/06* | (2006.01) |
| *H04W 4/80* | (2018.01) |
| *H04L 29/06* | (2006.01) |

(52) U.S. Cl.
CPC .......... *H04W 52/52* (2013.01); *H04B 1/0007* (2013.01); *H04B 1/06* (2013.01); *H04L 69/22* (2013.01); *H04W 4/80* (2018.02)

(58) Field of Classification Search
CPC ........... H04L 27/0014; H04L 2027/003; H04L 69/22; H04B 1/16; H04W 52/52
See application file for complete search history.

(56) References Cited

U.S. PATENT DOCUMENTS

| | | | |
|---|---|---|---|
| 2003/0108129 A1 | 6/2003 | Voglewede et al. | |
| 2007/0280362 A1* | 12/2007 | Lin | H03G 3/3052 375/260 |
| 2008/0273636 A1* | 11/2008 | Zhu | H03G 3/3078 375/345 |
| 2011/0102151 A1 | 5/2011 | Shin et al. | |
| 2012/0231756 A1 | 9/2012 | Otaka et al. | |
| 2013/0195229 A1 | 8/2013 | Cheng et al. | |
| 2014/0293808 A1 | 10/2014 | Tsai et al. | |
| 2015/0103937 A1* | 4/2015 | Cudak | H04L 25/06 375/267 |

(Continued)

FOREIGN PATENT DOCUMENTS

KR    20070060718 A    6/2007

OTHER PUBLICATIONS

"German Application Serial No. 102018105305.3, Office Action dated Nov. 11, 2019", 10 pgs.

*Primary Examiner* — David S Huang
(74) *Attorney, Agent, or Firm* — Schwegman Lundberg & Woessner, P.A.

(57) ABSTRACT

An improved receiver for use in a data pocket communications is provide, where the process of configuring the gain of the receiver and identifying a preamble in the data packet are made more robust. The improved receiver does not need to rely on the received power level exceeding a trigger threshold to initiate the gain control. Instead the gain control runs while the receiver is waiting for a data packet. The frequency correction process can run concurrently with the gain control process.

31 Claims, 12 Drawing Sheets

(56) References Cited

U.S. PATENT DOCUMENTS

2015/0349823 A1    12/2015  Qiu et al.
2016/0146922 A1*  5/2016  Moshfeghi .......... H04W 64/006
                                                                           455/456.6

\* cited by examiner

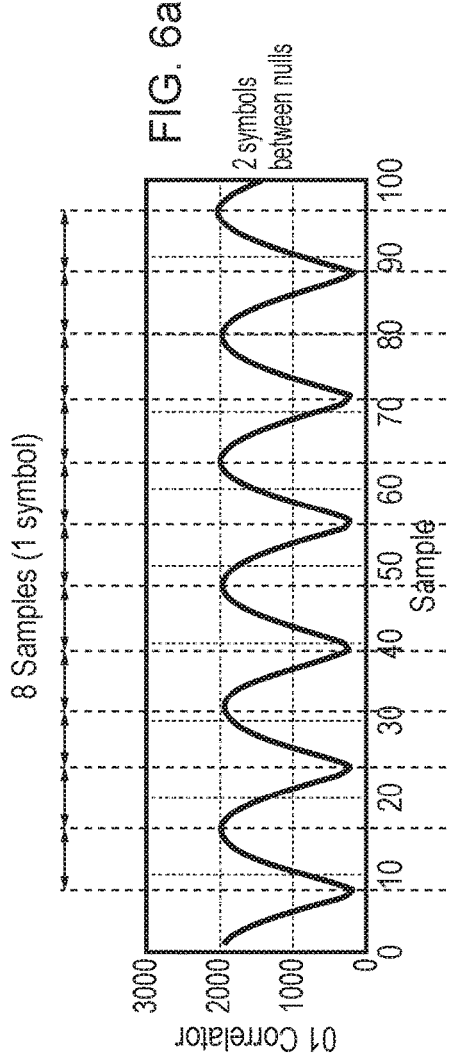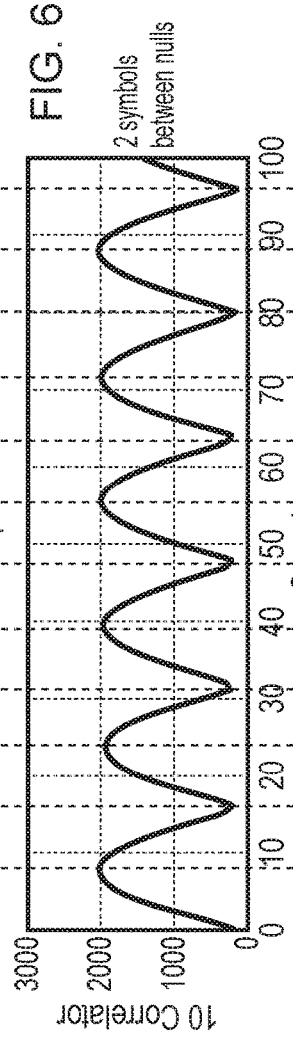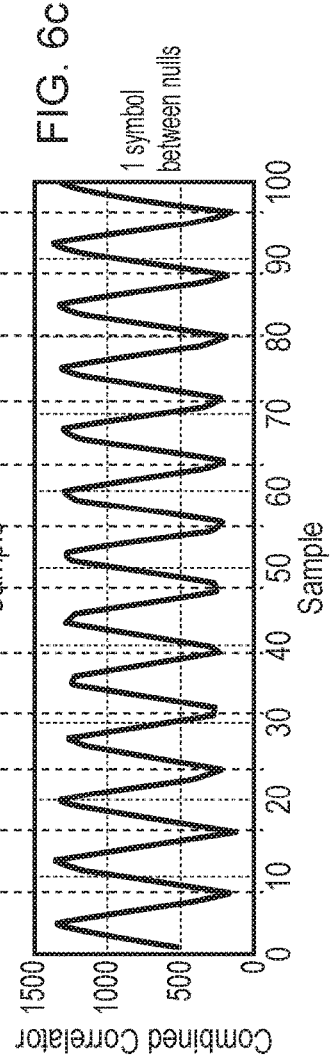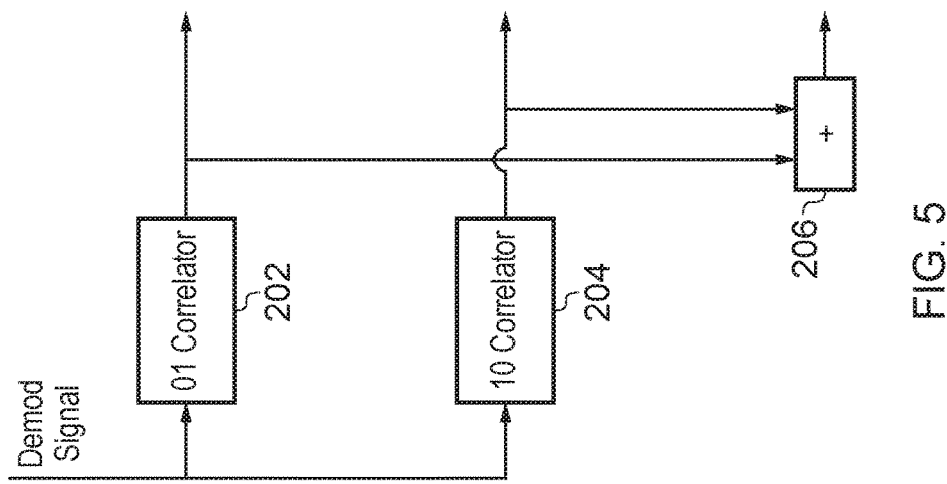

METHOD OF OPERATING A RECEIVER TO PROCESS A PREAMBLE OF A DATA PACKET, AND TO A RECEIVER OPERATING IN ACCORDANCE WITH THE METHOD

FIELD OF THE DISCLOSURE

The present disclosure relates to methods of and apparatus for improving the accuracy of detection of a preamble in a communication system. This is achieved without requiring the duration of the preamble to be increased.

BACKGROUND

There are many wireless communication systems in use. These frequently employ the use of data packets to transmit data between the transmitter and receiver.

The receiver does not know in advance when a transmitter wishes to initiate transmission of a message. Existing receivers tend to "listen" for potential signals whose energy exceeds a threshold. Once the threshold is exceeded the receiver attempts to perform automatic gain control, AGC, during a period which should encompass a preamble of a data packet if the signal which has exceeded the threshold value turns out to be a data packet. The receiver can be triggered by noise or other interference or temperature or environmental factors that will impact the composite receiver gain. Such interference may occur sufficiently close to the start of a data packet such that it interferes with the automatic gain control function implemented within the receiver.

SUMMARY OF THE DISCLOSURE

The present disclosure relates to an improved method of operating a receiver such that its gain adjustment process is more robust in the presence of interfering signals.

According to a first aspect of this disclosure there is provided a method of operating a receiver to process a preamble of a data packet. The method comprises performing a receiver gain adjustment by using a gain controller to adjust the gain of a radio frequency amplifier of the receiver. The gain control operation starts in advance of the reception of the data packet and runs until such time as the receiver has identified the preamble, or a portion of the preamble, to a sufficient level of confidence. Once the preamble is identified the gain control operation is terminated and the gain can then remain fixed for reception of the remainder of the data packet.

Preferably a receiver frequency offset correction is performed concurrently with the gain adjustment being performed. Performing both operations of gain and frequency adjustments in parallel allows improved accuracy to be achieved in "locking" onto the data packet without requiring the preamble sequence to be extended. This approach also gives each of the automatic gain control and frequency offset correction processes more of the preamble to work with compared to prior art schemes.

According to a further aspect of this disclosure there is provided a radio receiver operating in accordance with a method of the first aspect.

The radio receiver may be provided in association with a transmitter so as to allow bidirectional communication with a remote device.

The method and receiver disclosed herein can be used for data communication in accordance with keying schemes such as Gaussian frequency shift keying, GFSK, transmission schemes. Such schemes may be used for communication between multiple devices to operating in an ad hoc network, for example as part of an "internet of things" IOT, network located around a dwelling or business, as well as on personal devices, including entertainment and fitness trackers, or on medical devices and industrial devices requiring the ability to transmit data over relatively short ranges.

BRIEF DESCRIPTION OF THE FIGURES

Embodiments of the present disclosure will now be described, by way of non-limiting example only, with reference to the accompanying Figures, in which:

FIG. 5 schematically illustrates the action of first and second correlators operating in conjunction to recover a preamble from the data packet;

FIGS. 6a, 6b and 6c illustrate examples of outputs from the first correlator, the second correlator and the sum of the correlator outputs, respectively;

DESCRIPTION OF SOME EMBODIMENTS OF THIS DISCLOSURE

As mentioned before there are several wireless communication schemes that transmit data between transmitter and receiver in the form of data packets.

Figure 1:
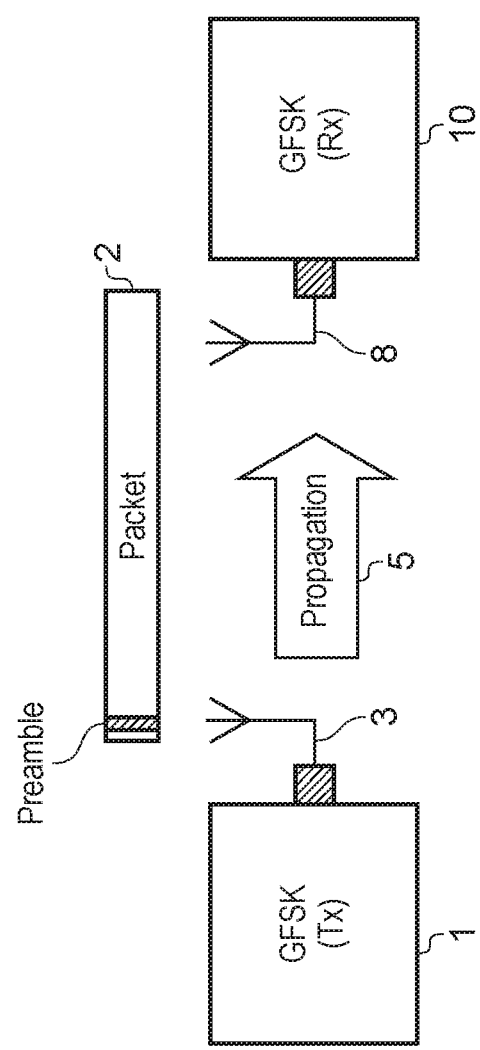
FIG. 1 schematically illustrates data packet transmission between a transmitter and receiver.

FIG. 1 schematically illustrates an example of a wireless communication system where a transmitter 1 prepares data as a data packet 2 which it sends to an antenna 3 such that the data, modulated in accordance with an appropriate transmission scheme, can be propagated by way of a communications medium 5 to an antenna 8 of a receiver 10. The receiver 10 acts to demodulate the transmitted radio signal and to recover the data that was encoded at the transmitter 1. The data is often sent in the form of a data packet 2 containing a known number of bits. The data packet 2 includes some control data such as a preamble and also an access address identifying the intended receiver. Examples of such communication schemes include frequency shift keying schemes, such as Gaussian frequency shift keying. However the teachings of this disclosure are applicable to any communication system employing a preamble. Thus the present invention is applicable to many communication schemes, such as Bluetooth low energy, BTLE, also sometimes known as Bluetooth smart.

Figure 2:
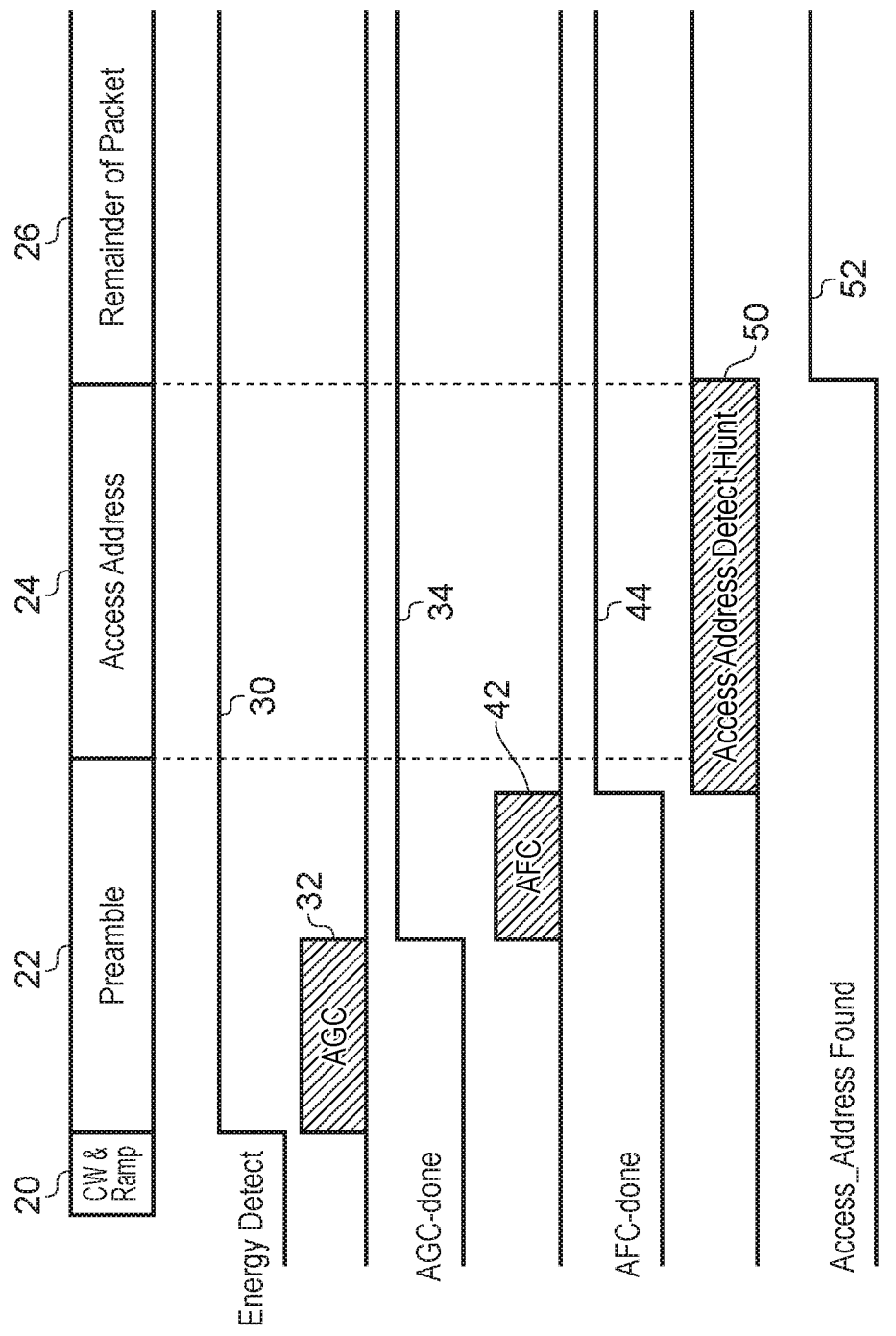
FIG. 2 schematically illustrates the processes performed in an approach to a receiver upon receipt of a data packet.

FIG. 2 schematically illustrates a lead portion of a packet 2 together with the actions performed by a receiver upon receiving the packet.

When the transmitter 1 of FIG. 1 is instructed to transmit data, it initially powers up its oscillator and transmit amplifier, thereby giving rise to a portion of the packet where a continuous wave signal of increasing intensity occurs, until such time as the transmitter reaches its nominal transmit power. This region is designated 20 in FIG. 2. Once the transmitter operation has become established, a preamble 22 is transmitted. The preamble contains a predetermined sequence of bits, known both to the transmitter and to the receiver. For example, the transmitter may transmit a preamble containing eight bits arranged as "10101010". It will be appreciated that other preambles are possible. Once the preamble 22 has been completed then the transmitter transmits an address 24 which represents an identifier for the receiver and device which are intended to receive the message being transmitted in the packet. The receiver address is generally known because the transmitter and receiver have at some point been "paired" in order to establish communications between them. Once the access address 24 has been completed then the remainder of the packet 26 is transmitted. This portion includes the data payload which the transmitter is intending to send to the receiver.

The receiver 10 of FIG. 1 sits listening to the signals received at its antenna. The receiver has no knowledge of the distance between it and the transmitter. Similarly it does not have knowledge of the propagation medium. As a consequence, the receiver assumes a worst case scenario of having to look for a signal of minimal strength. This ensures that weak or distant signals do not get lost. However this approach does come with the possibility that stronger signals will saturate the input stage of the amplifier or cause subsequent electronics, such as analog to digital converters, to be forced over range.

FIG. 2 shows the functions performed by the receiver in response to the data packet arriving at the receive antenna 8. In a first operation, the receiver notes that the level of energy being detected at the receive antenna 8 exceeds a threshold and asserts an energy detect signal 30. This then provokes the receiver to change the gain of its amplifiers, which generally means reducing the gain from maximum, until such time as the amplitude of the incoming power during the preamble falls within acceptable limits. The time taken to adjust the gain is represented by block 32 in FIG. 2. Once the gain has been adjusted an AGC done signal 34 is asserted. It should be noted that the time required to perform the automatic gain control represented by block 32 varies. If the incoming signal is relatively weak then the change in the gain required of the RF amplifier and other input stage amplifiers of the receiver is relatively modest and hence can be completed quite quickly. However if the signal is very strong then several gain adjustments might need to be made until such time as the gain is correctly set to avoid saturating the signal electronics or the analog to digital converter. The assertion of the AGC done signal enables the commencement of an automatic frequency correction process, as identified by block 42.

As will be discussed later, the automatic frequency correction process may merely act to estimate the difference or offset between the carrier wave of frequency the transmitter and the nominal receive frequency of the receiver. Completion of the automatic frequency correction process results in an AFC done signal 44 being asserted. Assertion of the AFC done signal initiates the commencement of a procedure to identify the access address encoded in the data packets. This is performed during the time period indicated by block 50 and once the access address signal has been found and decoded an access address found signal 52 is asserted. If the access address 50 corresponds to the address of the receiver, the receiver then proceeds to receive and decode the data payload 26. If the addresses do not match then the receiver knows that the data is not intended for it and if so desired can ignore the remainder of the packet such that it can re-enable the energy and packet detect process for monitoring the receipt of a subsequent packet.

In, for example, the Bluetooth low energy transmission scheme the preamble has a relatively short duration of 8 μs. The scheme shown in the approach of FIG. 2 is vulnerable to failure of or interference with the energy detect phase of the scheme. For example, the receiver may be in a noisy environment. This might occur where the receiver is in an environment heavily populated by Wi-Fi nodes. For example the Wi-Fi transmitters and receivers, i.e. devices operating in accordance with the IEEE 802.11 protocols can use five distinct frequency ranges which are 2.4 GHz, 3.6 GHz, 4.9 GHz, 5 GHz and 5.9 GHz bands. Bluetooth operates around a frequency of 2.45 GHz (2.402 to 2.480 GHz). It is therefore possible, due to the close proximity in frequency that despite the provision of filters and like, a signal from a Wi-Fi device operating at high power and in close proximity to, for example, a Bluetooth receiver may trigger the energy detection mechanism to assert the energy detect signal.

If the energy detect signal becomes asserted too early, for example due to an impulsive interference signal, then it is likely that the automatic gain controller will cause the gain to be set to an incorrect gain setting. The gain setting is likely to be the most sensitive setting since the gain was set in the absence of a signal for part of the setting time. Once the data packet actually arrives then it is likely that the data packet's power level will cause the analog to digital converter or other items within the signal chain to saturate. Additionally, in the arrangement of FIG. 2 the automatic frequency correction needs to occur during the preamble but has to wait until the gain is set. In an early (false) trigger occurs then the automatic frequency correction value will be estimated using an unknown input signal or noise and is likely to converge at an incorrect value. Failure or errors in the gain selection and frequency correction processes increase the likelihood that the access address detect hunting process will not find a valid access address and will trigger a time out. Thus, for any of these reasons, the set up process will fail and the data packet will be lost. Where the transmitter and receiver handshake this will trigger retransmission of the data packet and a reduction in the data throughput rates.

If the energy detect signal gets asserted too late, for example because the energy of the signal being received at the receiver is close to the sensitivity threshold of the receiver, then it is likely that the AGC will have to make no or little gain correction. However, the automatic frequency correction step is likely to fail as it may not complete, or indeed have started, whilst the preamble is being transmitted. If the AFC stage fails or provides its AFC done signal belatedly, then the access address detect step is likely to fail as it would have started the hunt too late to complete successfully.

The present inventors realized, among other things, that an improvement in reliability could be achieved by discarding the energy detect step which initiates the gain correction. Instead, as the receiver has already been listening for signals as this will be required in order to trigger the energy detect process, the AGC process can be left running whilst the receiver is waiting for a packet to arrive.

Figure 3:
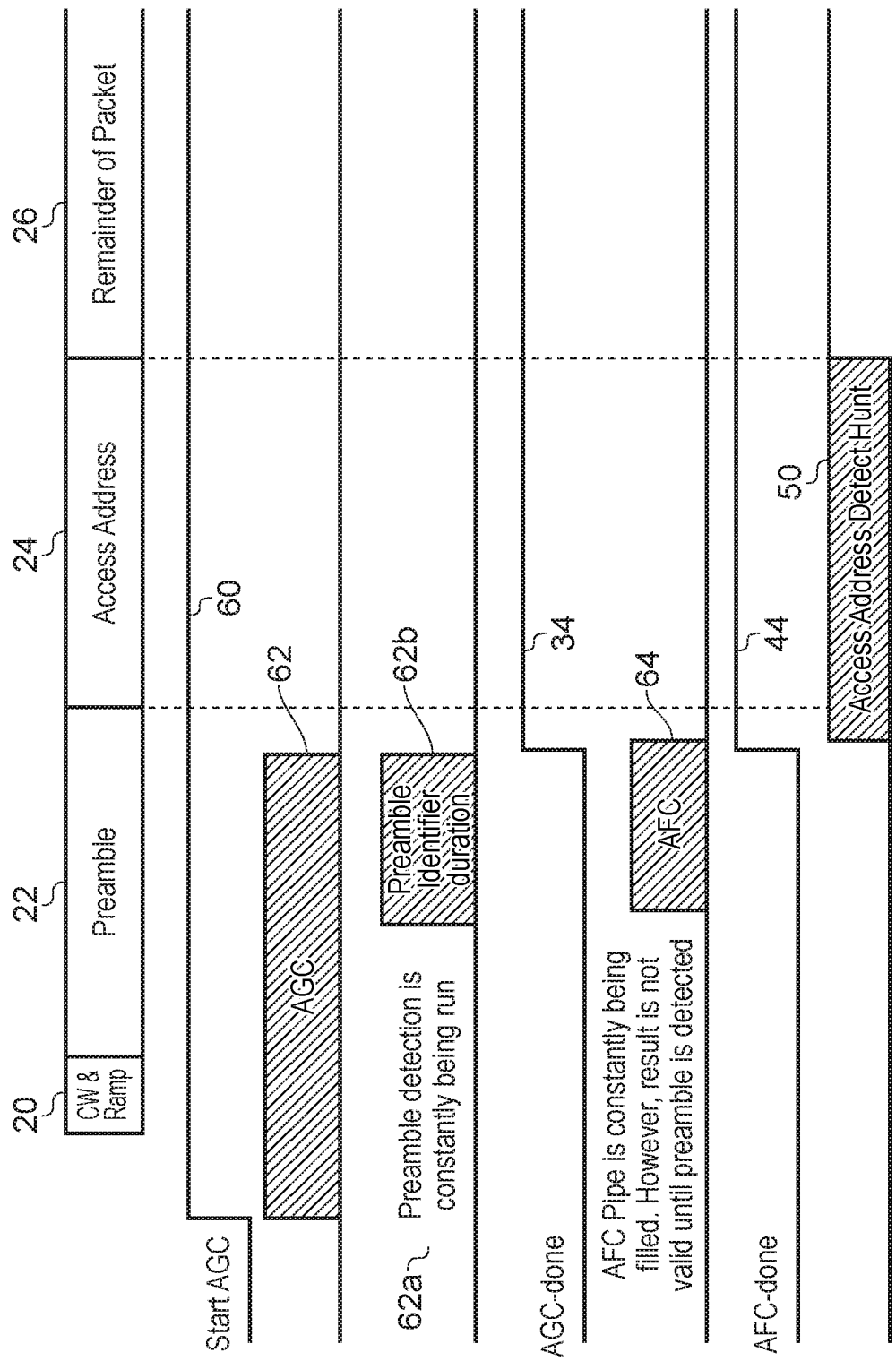
FIG. 3 schematically illustrates the processes performed by a receiver operating in accordance with the present disclosure.

FIG. 3 schematically illustrates an embodiment of the method in accordance with the present disclosure. We may suppose, for example, that a preceding packet has been received, and hence the receiver is returning to its monitoring state where it is looking for a new packet, potentially from a new device. The process starts by enabling the automatic gain controller to operate. This is achieved by asserting a "start AGC" signal 60. The start AGC signal may remain asserted during the duration that the packet is being received, because it can be ignored once the AGC has completed its gain adjustment process. Alternatively, the completion of the AGC process may cause the start AGC signal to be reset. In FIG. 3 the automatic gain process occurs during the time designated by block 62. Block 62 comprises two operations. In a first operation the AGC process is continually running in order to both set the gain of the amplifier and also to determine that the preamble is being transmitted. This slot is schematically designated 62a. Once the gain is correctly set, then the preamble needs to be examined for a sufficient period of time for the automatic gain controller to have a predetermined level of confidence that the preamble has been identified. This "preamble identifier duration" is designated as block 62. Once the preamble has been successfully identified by the automatic gain control process 62, the automatic gain control process completes and asserts the "AGC done" signal 34.

As shown in FIG. 3, the present disclosure runs the automatic frequency correction step in parallel with the automatic gain correction depth. This avoids the sequential processing shown in the arrangement of FIG. 2 and means that each of the AGC and AFC processes have more time to complete and can use a greater proportion of the preamble 22. The automatic frequency correction process relies on examining a block of data samples from the analog to digital converter. These samples are corrected whilst the AGC process is running. As a result, some of the samples may be saturated or otherwise suspect. However, the samples are continually shifted through a register and the result of the AFC process calculated with the contents of the register with the results being available, but not valid, until the preamble has been identified. Once the automatic frequency correction step, which we will explain later identifies a frequency mismatch, has been completed the AFC done signal 44 is asserted thereby enabling the access address detect hunt to initiate.

Thus, rather than running a completely serial set of steps, the processing steps can be rearranged such that some of them run in parallel and for longer and such that the gain correction and control and frequency correction processes are not dependent upon accurate timing of an energy detect signal, or indeed to not rely on the presence of an energy detect signal at all.

Figure 4:
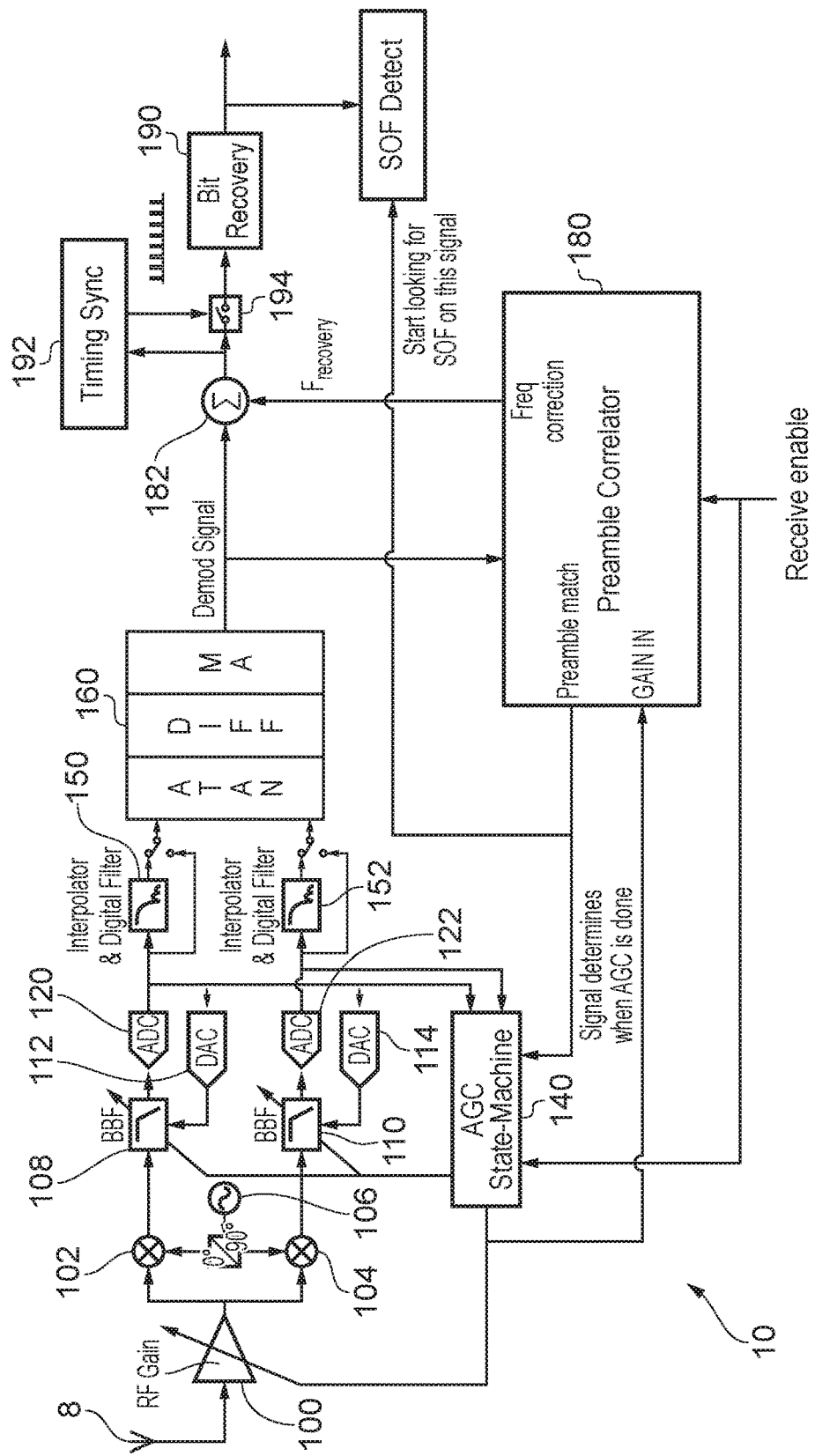
FIG. 4 is a schematic diagram of a receiver constituting an embodiment of the present disclosure.

FIG. 4 schematically illustrates the architecture of the receiver 10 in greater detail. A receiver 10 has a receive antenna 8 which is connected through input of a variable gain RF amplifier 100. Typically, such an amplifier may include a number of variable gain stages, and potentially controllable attenuators such the level of gain can be controlled without saturating the amplifier 100. An output of the amplifier is provided to an I-Q demodulator comprising first and second mixers 102 and 104 which receive a local oscillator signal at local oscillator inputs thereof. The local oscillator signal is provided by a local oscillator 106 and passed through a phase shifter such that the first mixer 102 receives a signal which is in-phase with the output of the local oscillator 106 whereas the second mixer 104 receives a signal which has been shifted by 90° with respect to the output of the local oscillator 106. The signal from the output of the RF amplifier is mixed with a local oscillator signal at the mixers 102, 104 in order to perform a frequency conversion as known to the person skilled in the art. If the LO signal is nominally the same frequency as the carrier frequency, then the modulated data is down converted directly to baseband. The down converted signals from the outputs of the mixers are then provided to variable bandpass or low pass filters 108 and 110 whose filter coefficients can be adjusted by changing the values of components therein. DACs 112 and 114 may be provided for DC offset removal as known to the person skilled in the art.

Outputs of the filters 108 and 110 are provided to analog to digital converters 120 and 122. The analog to digital converters 120 and 122 convert the analog signal into a series of digital codes. The digital outputs from the analog to digital converters 120 and 122 may be provided to an automatic gain controller 140 such that it can examine the output codes to make sure that the analog to digital converters are not being saturated or running close to saturation or alternatively that they are not being operated too close to their noise floor. Typically the automatic gain controller 140 is implemented as a state machine. The digital outputs of the analog to digital converters 120 and 122 may then be provided to interpolators and digital filters 150 and 152 before being provided to a digital front end 160. Alternatively, the digital front end may accept the outputs of the outputs of the analog digital converters directly. The digital front end processes the digitized I and Q channels of the quadrature detector in order to reconstitute the data signal as known to the person skilled in the art.

The demodulated signal (which is representative of the frequency deviation of the GFSK signal) is monitored by a preamble correlator 180 which seeks to identify the preamble to a predetermined degree of accuracy, and also can take over the job of calculating the automatic frequency correction result to provide a correction value which is used to adjust the demodulated signal from the digital front end 160. The adjustment may be made by way of a summer 182. Once the preamble has been located then the receiver may also enable recovery of the data provided in the packet, possibly by way of a bit recovery circuit 190 whose operation may be modified by a timing synchronization circuit which controls the opening of a sampling eye of the bit recovery circuit in order that the receive signal may also act as its own data clock. This will be discussed in greater detail later.

FIG. 5 schematically shows the functionality within the preamble correlator 180 in greater detail. As shown in FIG. 5, the demodulated signal output by the digital front end 160 is provided to two correlators 202 and 204 which operate in parallel. Each correlator knows and has encoded therein a part of the preamble that it is looking for. The first correlator 202 is arranged to look for a zero and a one in that sequence. The second correlator 204 is arranged to look for a one and a zero in that sequence. Further correlators operating over different correlation lengths may be provided.

The analog to digital converters and digital front end operate in oversampled manner. Thus the symbol representing a "1" may be oversampled N times. Typically N is an integer number and in this example is chosen to be eight. The symbols are both bandwidth limited and potentially shaped, and hence do not have a square wave form. Typically they follow a half sinusoid or Gaussian-like shape.

If we assume that the demodulated signal does indeed contain a preamble, then the output of the first correlator 202 is represented by FIG. 6a. Similarly, the output of the second correlator 204 will typically be represented by FIG. 6b. In each case it can be observed that there are two symbols occurring between successive null, or minimum, points in each of FIGS. 6a and 6b, and that a minima in FIG. 6a aligns with a maxima in FIG. 6b. The outputs of the first and second correlators 202 and 204 can be combined by a composite minimum value selector 206, optionally with some scaling, such as divide by two, to achieve a graph of the type shown in FIG. 6c. Here it can be seen that the distance between adjacent minimum values corresponds to one symbol.

The action of each correlator can be represented by the following equation:

$$c(k) = \sum_{n=0}^{8D-1} |refcorr(k) - x(k-n) + AVG(k)| \quad \text{Equation 1}$$

$k$ = sample $refcorr$ = Reference Correlator $x$ = Demod signal $D$ = Correlator depth (in symbols) = $Q$ samples $AVG$ = Average value of the correlation window $c$ = Correlator output It can be noted that the use of parallel correlators reduces the number of samples required for each correlator to identify the correlation that it is looking for. This has the advantage of giving the designer greater flexibility about the number of minima, or maxima, from the combined output that need to be processed in order to provide an acceptable degree of certainty that the preamble has been located.

The correlation calculation includes an average value of the correlation window. However the average value turns out, as will be described later, to be representative of the frequency correction that needs to be applied and therefore needs to be taken into account to make sure that the correlator output values do not become shifted towards a greater or lesser values in the code space represented in FIGS. 6a to 6c which might complicate or disrupt the identification of the trough in the correlator output.

The output of the digital to analog converters are typically a multi-bit word whose value may, for example, be expressed in 10, 12 or more bit accuracy. Thus the value of codes from the analog to digital converters may range between relatively low values, and values in the range of one or two thousand. The correlator may itself include the multi-valued correlation sequence, or may simply include a sequence of zero and one as appropriate to the bit stream that it is seeking to select. As a result of the variable gain from the input stage and variation of received signal strengths steps must be taken to identify the nulls (or potentially peaks) in the combined output of the correlators.

Figure 7:
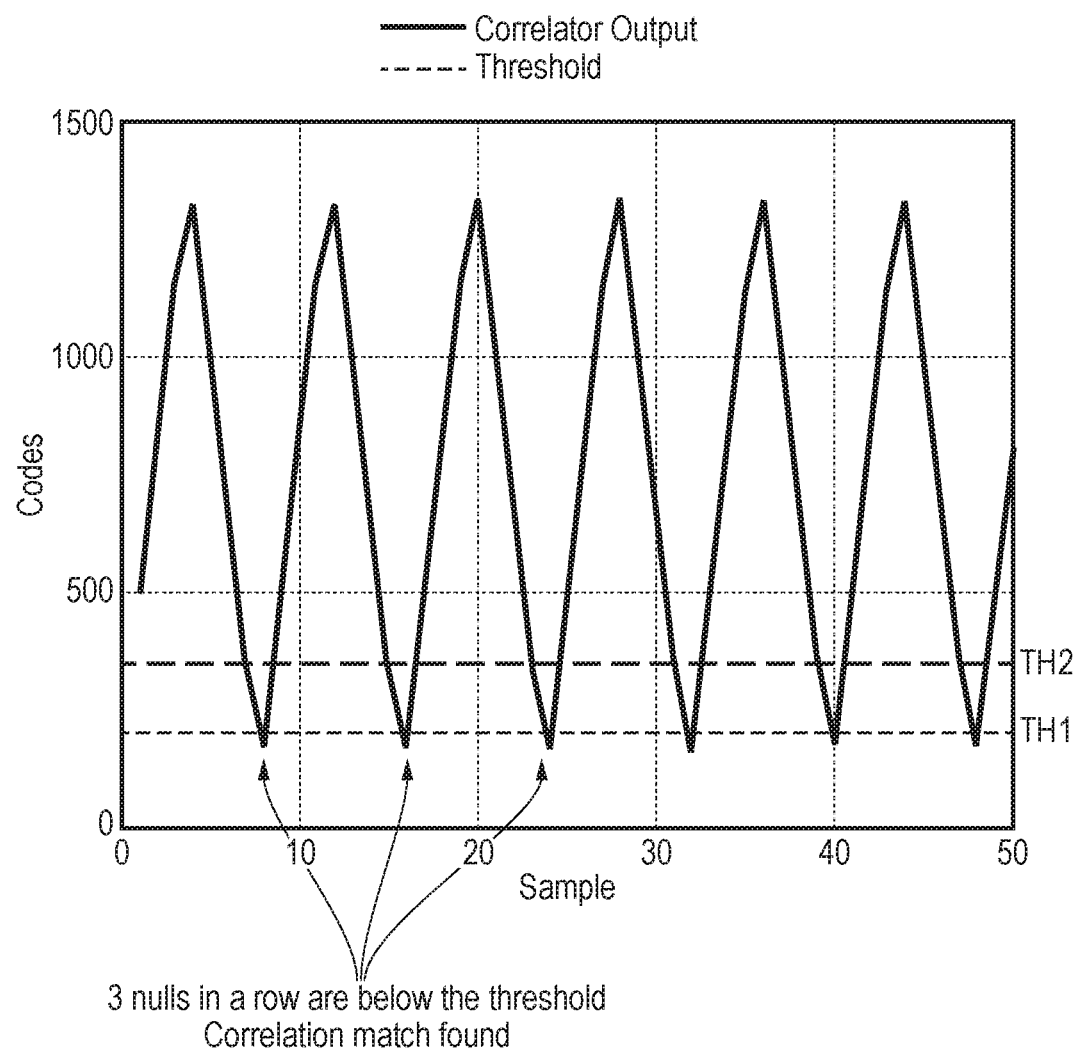
FIG. 7 schematically illustrates the operation of the correlator to determine whether the preamble has been located.

FIG. 7 shows a portion of the combined correlator output in greater detail, together with the values thereof extending over an arbitrary range of codes which in this example range between zero and 1500. The correlation pattern is offset from zero by an amount which corresponds (at least in part) to a frequency offset. However as will be explained later, the frequency offset can be estimated during the correlation process in order to substantially remove its effects. As a result minima can generally be detected by looking for instances when the value in the correlator output falls below the threshold value represented in FIG. 7 as TH1. The method and circuit in accordance with the present disclosure may be arranged to assert the preamble as being successfully located once three consecutive minima, with an appropriate inter-minima spacing, are located in the output of the correlator. Thus three minima dropping below the value of TH1, in this example, signals that the preamble has been identified.

In the presence of the weaker signal or more noise, given that noise is likely to be additive to the received signal, then consecutive minima may not fall below threshold TH1. However several tests may be applied to determine if the preamble has been identified. Thus, for example, the preamble may also be deemed to have been identified if four minima in a row are located, with the minima being below a threshold. TH2, where the value of TH2 is greater than the value of TH1. This principle can be extended so the preamble could be identified as being detected if five minima in a row are located, where the minima are less than a threshold value TH3 where TH3 is greater than TH2 and TH1. The threshold values TH1, TH2 and TH3 may be fixed or alternatively they may be dynamic, for example as being a function of the dynamic range (peak to trough) of the signal and its average value.

This cascaded approach means that in situations where the incoming signals have a high signal to noise ratio then the troughs/minima in the correlator output will be deep and only a small number of such troughs needs to be detected with a fairly aggressive threshold to identify that the preamble has been located. This provides for faster detection of the preamble once the game has been set, which is advantageous because in the case of high signal to noise ratio signals it is likely that the automatic gain control step has used more time to complete. Hence in engineering terms it is regarded as having used more of the preamble budget. In the case of incoming signals with a low signal to noise ratio, e.g. much closer to receiver sensitivity limits, the minima will be less deep and hence using an aggressive threshold is less likely to offer an indication that preamble has been found. However slow detection looking for more minima but with a less aggressive threshold will work because it allows the detection to take more time as the AGC process will have used less of the preamble budget.

In general the preamble detection method can look for any number of minima or indeed maxima, as appropriate.

Figure 8:
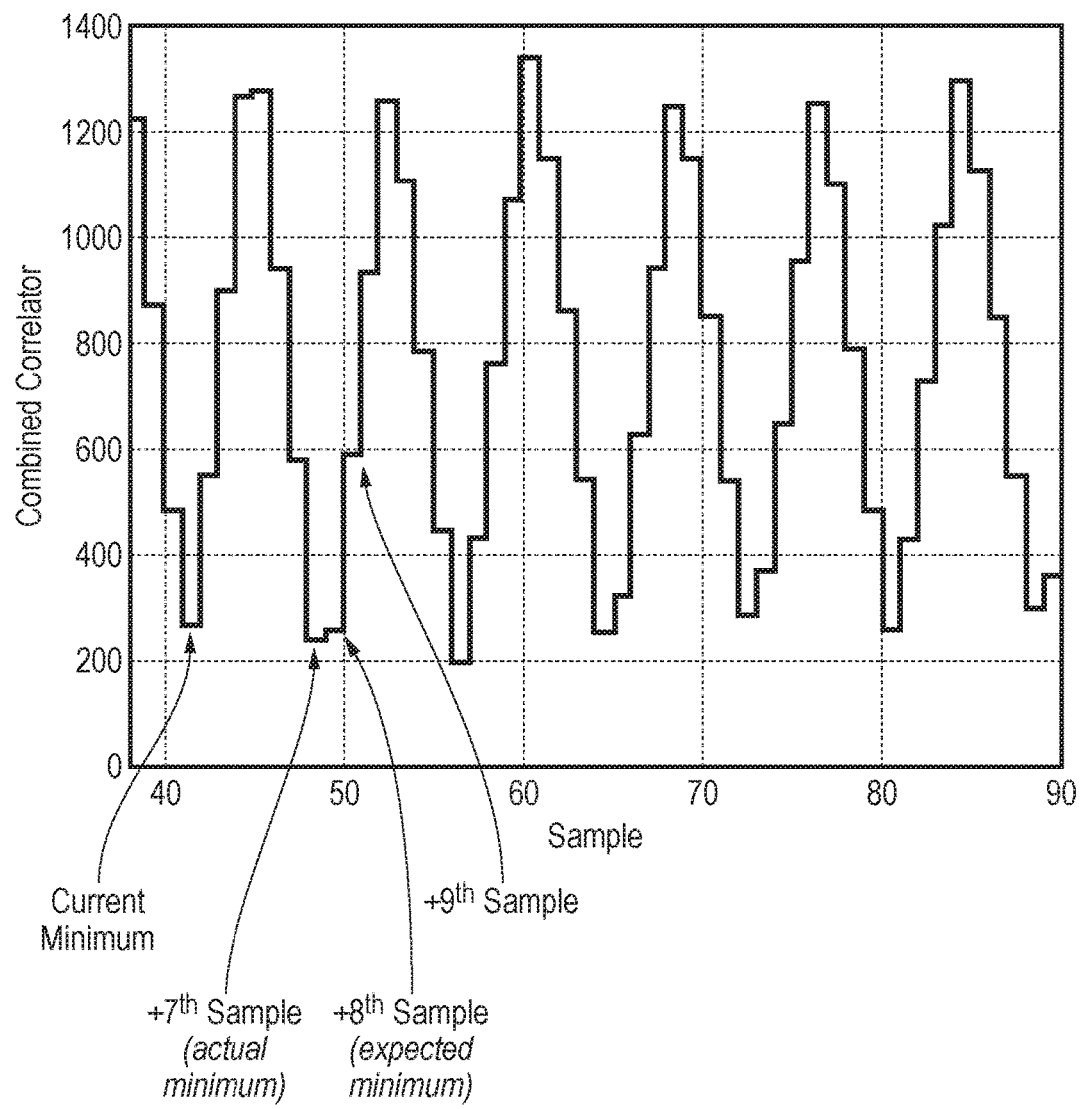
FIG. 8 schematically illustrates an example of correlator output for an embodiment where the input symbol at the receiver is eight times over sampled.

FIG. 8 represents a more realistic illustration of the signal of FIG. 7, recognizing that with limited oversampling, for example eight times, then the waveform takes a much more block like shape. In a scheme where the transmit data rate and the oversampling rate are known, then the distance between one minima and the next can be calculated. However, the sample value which corresponds to the first minimum is not known because the operation of the transmitter and receiver are asynchronous. In FIG. 8 the correlator output is such that a first minima is identified at sample 42 in the sampling scheme. The next minima should occur eight samples later i.e. at sample 50. However, in the presence of noise in the communications channel the actual minima of the subsequent sample may occur at an offset of +7 samples rather than the +8 samples as expected. It is therefore appropriate to monitor the threshold value not only at the expected sample, but at adjacent samples, i.e. the +7th and +9th samples and to accept that any of those samples falling below the threshold value TH1, TH2 and so on as appropriate, represents an alternative approach for that particular part of the test to identify the preamble. The threshold for adjacent symbols i.e. the seventh and ninth symbols may be set to a different values. The threshold of these adjacent sample values might be higher than for example TH1, or indeed could be set to be lower than TH1. Of course, they could also be equal to TH1, TH2 and so on.

Figure 9:
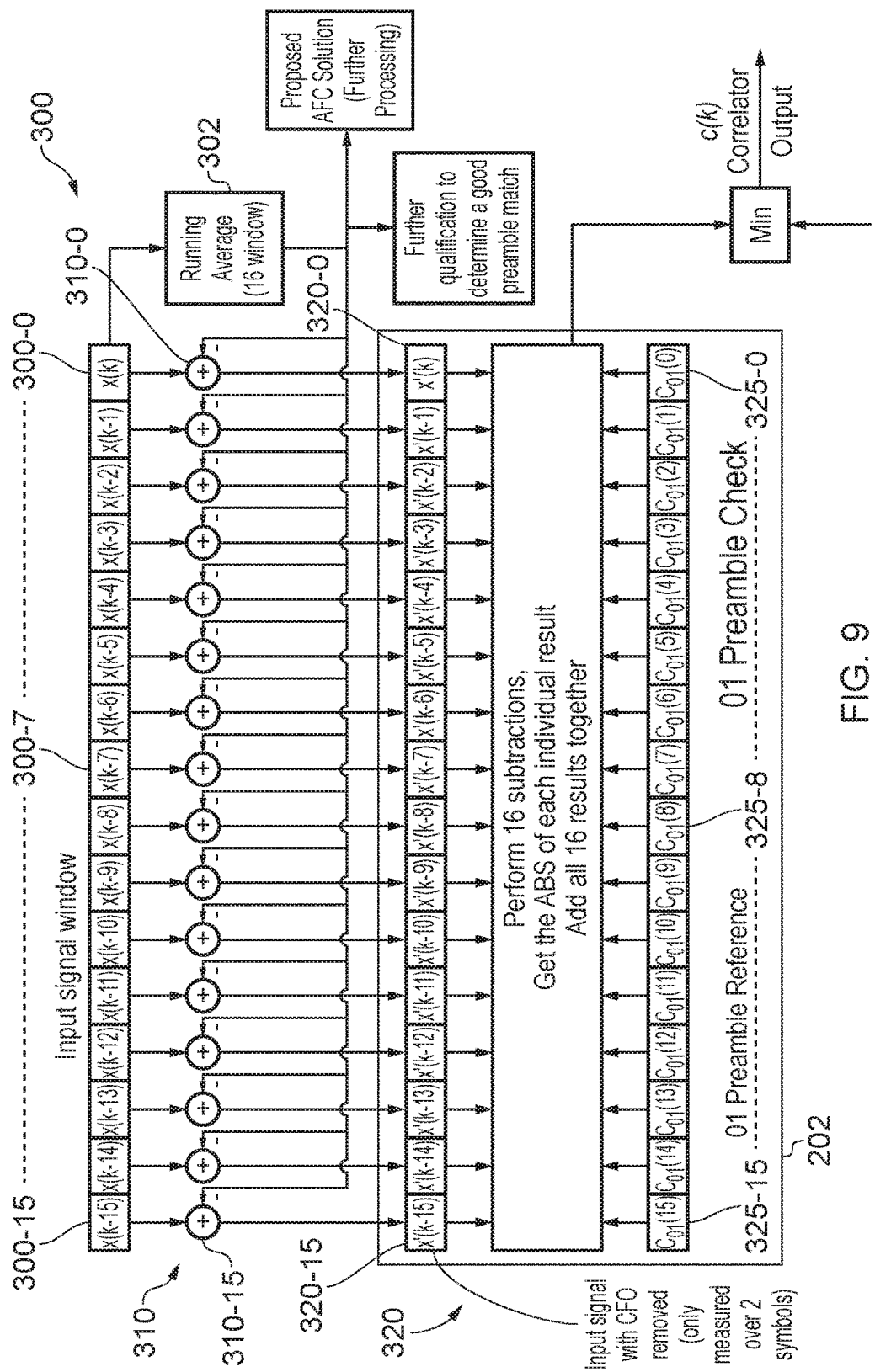
FIG. 9 schematically illustrates the processing steps performed within the receiver.
Figure 9:
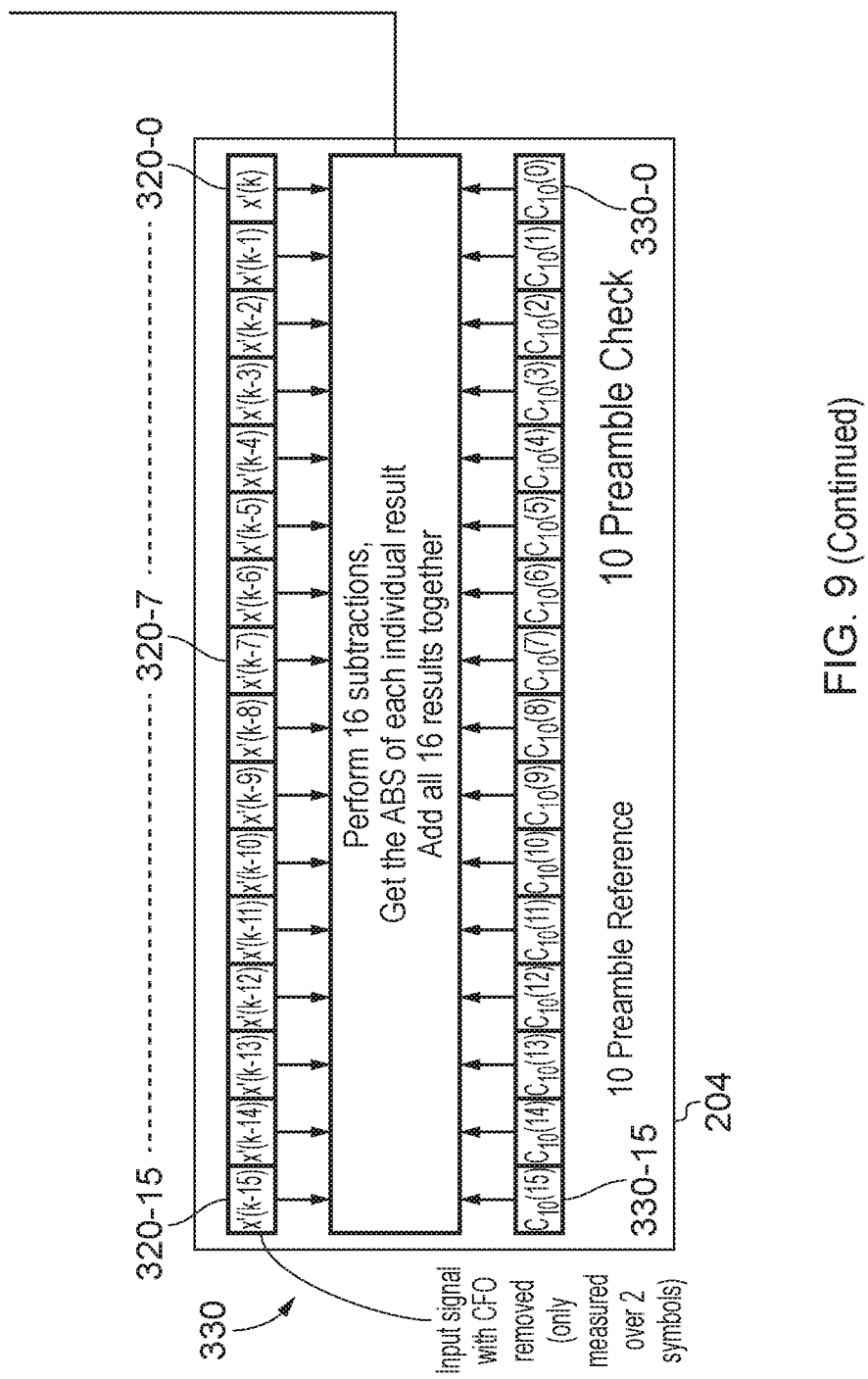

As suggested before, there is going to be a frequency mismatch between the carrier frequency of the transmitter and the frequency of the local oscillator used for down conversion. In general, the transmitter and receiver oscillators may be at different temperatures and hence are likely to have a modest mismatch between frequencies. For example, in the IEE 802.11 standard oscillator precision tolerance is specified to be within 20 parts per million. This gives a potential carrier frequency offset error in a range of −40 to +40 parts per million. However, whilst that number is low, it is noted that when applied to a carrier operating at 2.4 GHz this gives rise to a carrier frequency offset of up to 96 kHz. Further offsets may be introduced if either of the receiver and transmitter are moving because of the Doppler effect. However, the offset can be calculated during the correlation process. A circuit for performing this may now be described with respect to FIG. 9. An input signal buffer 300, for example in the form of a shift register comprising individual registers 300-0 to 300-15 keeps a record of the plurality, Q, of samples, for example 16 samples in this instance. Sample x(k) represents the most recent sample introduced to the buffer. As each sample arrive the most recent sample is shifted by one element within the buffer so x(k) becomes x(k−1) when the new signal arrives and becomes x(k−2) when the further new signal arrives and so on. The sixteen samples contained in the sample buffer 300 are also processed by an averager 302 to form an average of those 16 samples. An output from each register 300-0 to 300-15 of the buffer 300 is provided to the summing input of a respective summer 310-0 to 310-15. Each of the summers also receives the output of the running averager 302 at a subtracting input thereof. The output of the average can be represented by AVG(k), as used in equation 1 above. The output of each one of the summers 310-0 to 310-15 is provided to a further register block 320 containing registers 320-0 to 320-15 storing the results of the subtraction x'(k) to x'(k−15). Each of these values is compared with the stored "01" preamble reference stored in registers 325-0 to 325-15 of the correlator 202. Thus registers 320-0 to 320-7, representing correlation values $C_{01}(0)$ to $C_{01}(7)$ may contain 0 s (or values selected to represent 0 s) and registers 320-8 to 320-15 representing correlation values $C_{01}(8)$ to $C_{01}(15)$ may contain is (or values selected to represent 1 s). Thus the difference between x'(k) and $C_{01}(0)$ is formed. Similarly the difference between x'(k−1) and $C_{01}(1)$ is formed and so on. The absolute value of each difference is formed and the sum of the sixteen absolute values is provided at an output of the correlator 202.

The correlator 204 works in a similar manner thus, the value in register 320-0 is compared with, for example subtracted, from a correlation preamble reference $c_{10}(0)$ stored in the preamble register 330 and the absolute value taken. Similarly each other corresponding pair of values is compared. Thus the content of register 320-15 being x'(k−15) is subtracted from $C_{10}(15)$ of the preamble register 330. For each of these subtractions an absolute value is formed and then a sum of the absolute values is formed to provide an output of the correlator.

The output of the averager 302 is representative of the frequency offset, but also provides the data required to correct for it. Thus the subtraction of the average value at the summers 310-0 to 310-15 provides a signal with automatic frequency correction applied. Typically, for oversampled GFSK signals that are recovered using the receiver described in FIG. 4, the incoming signal is represented by a frequency deviation at the demodulator. For '01' or '10' symbols patterns (or multiples repetitions thereof), the relative frequency offset between the transmit and receive units can be calculated by averaging the oversampled signal over the entire oversampled duration for the two symbols (or multiples thereof)—in this case 16 samples (or multiples thereof). Furthermore, obtaining such an average is not constrained by which sample point in the oversampling process that averaging is commenced, provided the incoming signal maintains the alternating 10 pattern. By averaging the incoming demodulated signal over the most recent 16 samples, its average offers the best guess for the frequency offset for that two symbol window. Removing the frequency offset estimate over the most recent two symbol window provides additional robustness to the correlator performance and particularly offers it robustness to frequency offsets which is a problem with prior-art solutions.

Figure 10:
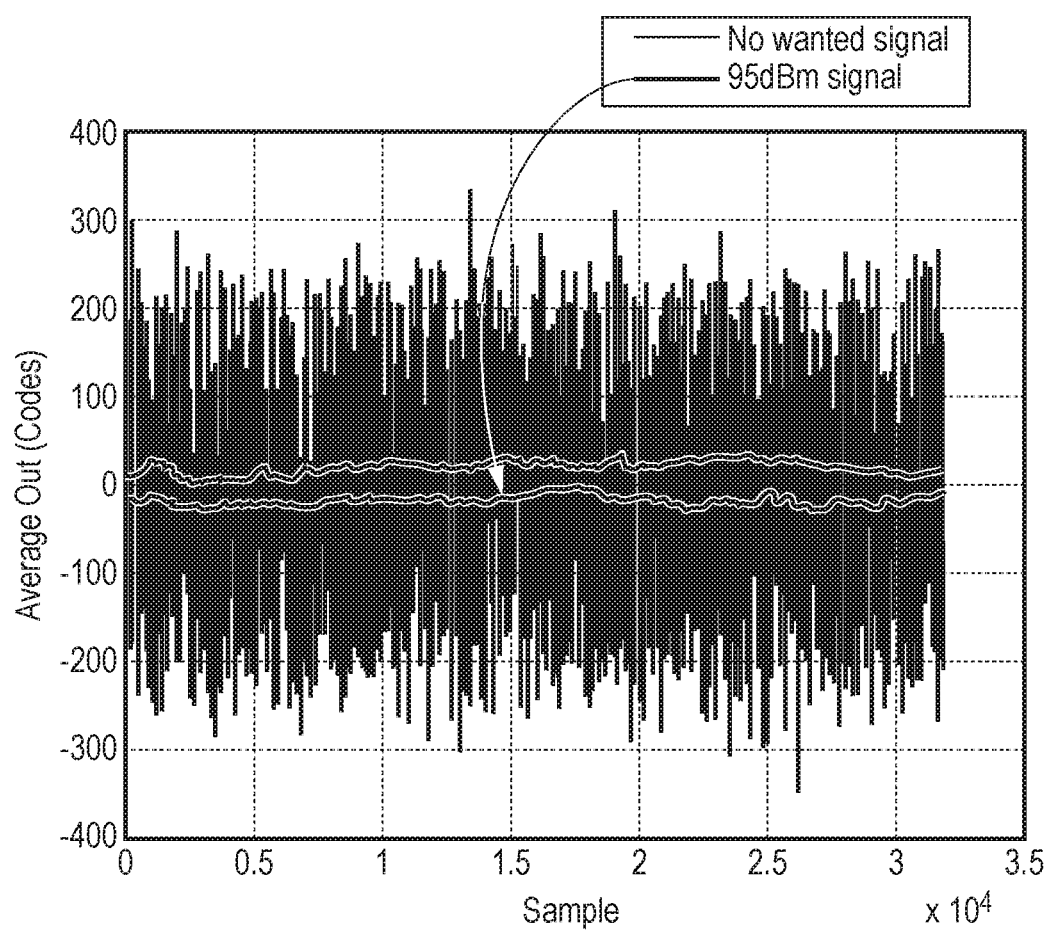
FIG. 10 schematically illustrates the average of the output of the average in the presence of noise, and in the presence of a signal representing the limit of sensitivity of the receiver.

The output of the average 302 changes each time a new input value is introduced into the buffer 300. The variation in the output of the averager 302 as a function of sample number could be used as a measure of goodness to further qualify that the preamble has been received. FIG. 10 graphically plots the average output over a range of codes, which has been re-biased to the average value output by the averager so as to plot the deviation of the running average value from the average value of the running average value. It can be seen that, in the presence of no signal a variation in codes is quite large, generally exceeding 100 code differences and exceeding 200 code difference values for a significant number of averager output values. However, in the presence of a wanted signal, which in this example has a value of −95 dBm which is close to the receiver sensitivity limit, it can be seen that the variation in output of the running averager 302 is much more constrained. Typically being within 20 or 30 codes of the average value. Based on this observation, and historical data for the receiver the instantaneous output value of the averager 302 can be compared with a historic average and if it exceeds a qualification threshold then a detection of a preamble can be deemed as likely to be false. As such the receiver may choose to reject the possibility that a packet is present.

Figure 11:
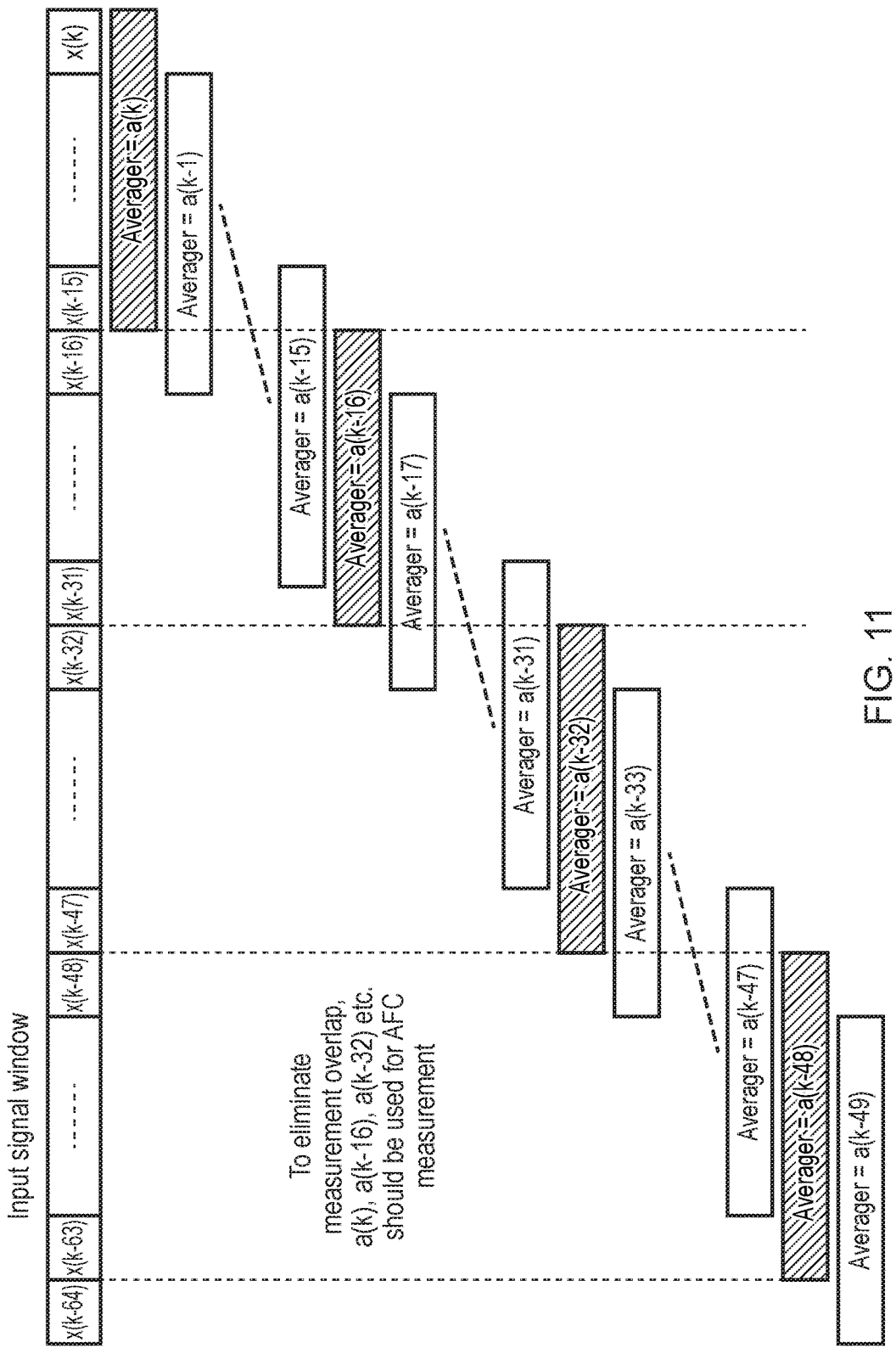
FIG. 11 schematically illustrates how the values from the average may be selected.

An advantage of the present disclosure is that the carrier frequency offset correction can be performed in parallel with the preamble detection. In such an arrangement the carrier frequency offset can be calculated by averaging the demodulated signal in the presence of the preamble over a multiple number of two full symbol durations. A symbol is represented by a plurality of ADC output values. Thus, in the case of an eight times over sampled system then one symbol is represented by eight consecutive sample outputs. FIG. 11 shows an example where one average measurement formed across two symbols may span the values x(k) to x(k−15). However, it is a possibility that more than two symbols will need to be examined in order to determine the carrier frequency offset correct to a desired degree of accuracy. The symbols or averages relating to further back in the measurement window may also need to be processed. It is advantageous that any given symbol is not double counted thereby giving it undue weight in the numerical processing that is performed. Thus, the position of the average should be selected to ensure that no symbol participates in consecutive averages. This is schematically illustrated in FIG. 11 where an offset corresponding to two symbol lengths is allowed to pass or to occur before an average value can be picked up from the output of the running averages 302.

Because the operation of the transmitter and receiver are asynchronous, in the sense that there is no common timing reference to time align their clocks, steps should be taken to identify which one of the oversampled values should be taken as being a representative of the data symbol which is being transmitted.

The correlator outputs have minimum values which encode timing information. Specifically, the position of the minima effectively encode the position where the symbol value is optimally extracted.

Figure 12:
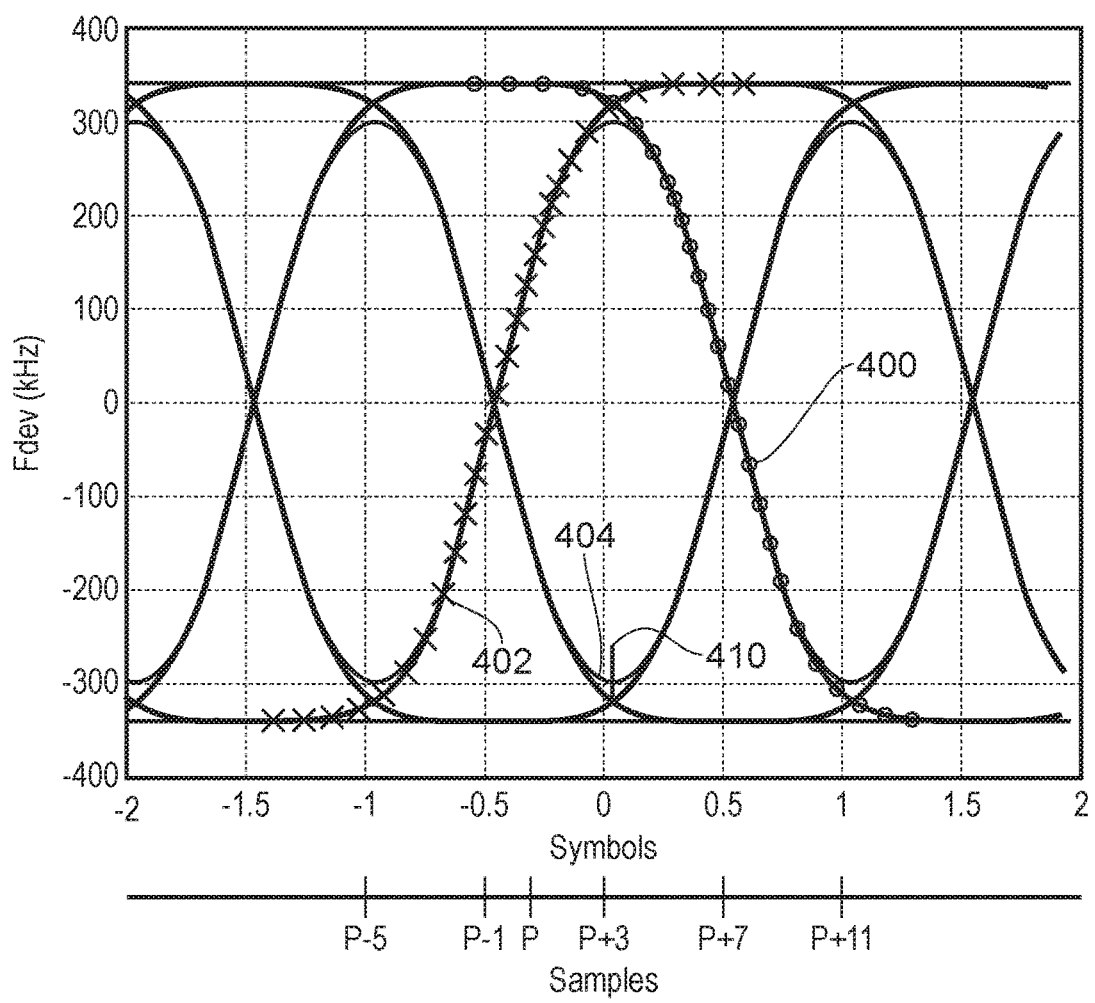
FIG. 12 illustrates an "eye" timing diagram for selecting appropriate ones of the oversampled output of the demodulator for provision to a bit recovery circuit.

FIG. 12 is a diagram representing a plurality of signal transitions. Such diagrams are familiar to the person skilled in the art when identifying "eye openings" for data-clock recovery. For ease of explanation assume that we have a sequence of samples. For generality one of the samples has been designated as the Pth sample. The timings of the symbols have been represented with respect to a zeroth symbol which occurs slightly after the P+3 sample.

One of the lines in FIG. 12, designated 400 and represented by a chain of circles representative of a transition between 1 and 0. With the sample point of each symbol being such that final "1" before the transition should be sampled at sample P+3 and the 0 sampling would occur around sample P+11 for a receiver operating at 8 times oversampling. Line 402 represented by a chain of crosses represents a transition from 0 to a 1 where a final 0 value before the transition should be sampled at sample P−5 and the 1 value should be sampled at sample P+3. Line 404, represented as a solid line represents a transition from 1 to a 0 and back to a 1 where the 0 should be sampled at sample P+3 as that is the closest sample to the mid-point (shown by line 410) of the 0 symbol and the is should be sampled around samples P−5 and sample P+11.

To avoid the processing overhead of having to look at a sequence of all the samples and work out where the peaks and troughs are the individual samples can be gated, for example, an electrically controlled switch or a logical gate such as an AND gate, both of which can be regarded as acting as a transmission gate. The switch or gate is represented in FIG. 4 as item 194 and is controlled by a timing signal generated by timing synchronization circuit 192. Timing synchronization circuit 192 estimates which samples should be allowed to progress to the bit recovery circuit 190, selecting every 8th sample, based on information determined by the correlator and a suitable offset, or sample count, as determined by the designer or by experiment. This approach means that every signal propagated though the switch 194 is assumed to be close to "as good as it gets" and no further effort needs to be expended on looking adjacent samples to determine whether they are better or worse in terms of recovering transmitted data.

As a consequence, timing synchronization can also be performed in parallel with the preamble identification and carrier frequency offset processes. Thus the receiver can be configured for a section of the data packet within the duration of the preamble.

In experiments performed by the applicant for relatively weak signals or use in noisy environments (in the sense that many potential interfering signals exist) has resulted in packet loss rates being reduced from around 10 to 15% to less than a few percent.

Typically, a receiver may include a phase lock loop for locking the frequency of the local oscillator to the transmitter frequency. Receivers in accordance with this disclosure may include such a phase lock loop. However, the phase lock loop operates over a relatively long timescale, typically 40 to 50 µs as a filter time constant for adjusting the local oscillator frequency whereas the automatic frequency correction based on analysis of the preamble can be done in a timescale of around 3 µs Consequently a fast digital correction may operate concurrently with a slower PLL style correction in order to reduce frequency offset between the carrier wave frequency and the local oscillator frequency.

It is thus possible to provide an improved method for identifying the preamble of a data packet and configuring a receiver so as to enhance the likelihood of it successfully recovering the data contained in the data packet. It is also possible to provide the receiver operating in accordance with the method.

The claims herein have been presented in single dependency format suitable for filing at the USPTO but it is to be understood that any claim may depend on any preceding claim of the same type unless such dependency is clearly technically not feasible.

The invention claimed is:

1. A method of operating a receiver to process a preamble of a data packet, the method comprising:
   performing a receiver gain adjustment by using a gain controller to adjust a radio frequency amplifier gain based on a magnitude of the preamble, in which the gain adjustment s performed on signals received in advance of the preamble being received and identified, and
   wherein the receiver gain adjustment only completes once the preamble is identified.

2. A method as claimed in claim 1, in which the preamble is identified by locating a portion of the preamble to a predetermined threshold of certainty.

3. A method as claimed in claim 1, further comprising concurrently performing a receiver frequency adjustment whilst the receiver gain adjustment is being performed.

4. A method as claimed in claim 3, in which the automatic frequency adjustment process is operating on data in advance of the data packet arriving at the receiver.

5. A method as claimed in claim 1, in which the preamble is identified using a plurality of correlators, each looking for a respective part of the preamble sequence.

6. A method as claimed in claim 5, in which the correlators process a sequence of N samples received from a demodulator, and sliding average of the N samples is formed.

7. A method as claimed in claim 6, in which each one of the N samples has its value modified based on the sliding average to form a modified sample.

8. A method as claimed in claim 7, in which the modified samples are correlated with a portion of the preamble, and turning points in the correlator output are compared with a threshold to detect the preamble.

9. A method as claimed in claim 8, in which the turning point is a minimum and the magnitude of a plurality of consecutive minima are compared with a threshold or in which the turning point is a maximum and the magnitude of a plurality of consecutive maxima are compared with a threshold.

10. A method as claimed in claim 9, in which the threshold value varies with respect to the number of minima or maxima that must pass a test set by the threshold to determine presence of the preamble.

11. A method as claimed in claim 1, in which the gain controller is operative in advance of a data packet arriving at the receiver.

12. The method of claim 1, comprising performing a frequency offset correction using at least two correlators acting in parallel to identify different bit sequences within the preamble.

13. A method of operating a receiver to process a preamble of a packet of data, the method comprising:
correlating an output of a demodulator with at least one segment of data representative of a preamble of the packet of data during a period when the receiver is performing automatic gain control; and
analyzing an output of at least one correlator to locate troughs or peaks in the output of the at least one correlator, wherein the number of troughs or peaks needed to pass a threshold to indicate that a preamble has been identified varies as a function of a magnitude of the troughs or peaks.

14. A method as claimed in claim 13, in which turning points in a correlation function are used to select a subset of the outputs of the demodulator for processing to receive a data payload of a packet of data.

15. The method of claim 13, in which a gain adjustment is performed on signals received in advance of the preamble being received and identified.

16. A receiver, comprising an automatic gain adjustment circuit and a frequency offset correction circuit, wherein the gain adjustment circuit and frequency offset correction circuit operate concurrently on a preamble of a data packet and the gain adjustment circuit operates to perform a receiver gain adjustment by using a gain controller to adjust a radio frequency amplifier gain based on a magnitude of the preamble, wherein the frequency offset circuit comprises at least two correlators acting in parallel to identify different bit sequences within the preamble.

17. A receiver as claimed in claim 16, in which the output of the correlators are used to control a transmission gate used to decimate an output of a demodulator of the receiver.

18. A receiver as claimed in claim 16, in which the correlators act on a block of data comprising N samples, and an average from an average of the N samples, and the value of each sample is modified to form a modified value when it is presented to the correlators.

19. The receiver of claim 16, further comprising a timing synchronization circuit configured to operate concurrently with the gain adjustment circuit and the frequency offset circuit to control samples of the data packet provided to a bit recovery circuit, the bit recovery circuit configured to recover data provided in the data packet.

20. The receiver of claim 19, wherein the timing synchronization circuit comprises a switch controlled by the timing synchronization circuit to provide a selected subset of a plurality of samples of the data packet to the bit recovery circuit.

21. The receiver of claim 19, wherein the tinging synchronization circuit is configured to control the samples of the data packet using input from the at least two correlators.

22. A device arranged to communicate using a short range data communication protocol using data, packets that include a preamble, the device comprising:

a receiver arranged to operate to process a respective preamble of a data packet; and
a gain controller that performs a receiver gain adjustment to adjust a radio frequency amplifier gain based on a magnitude of the respective preamble, wherein the gain adjustment is performed on signals received in advance of the respective preamble being received and identified, and wherein the gain adjustment only completes once the respective preamble is identified.

23. The device of claim 22, the device configured for correlating an output of a demodulator with at least one segment of data representative of the respective preamble of the packet of data during a period when the receiver is performing automatic gain control, in which an output of at least one correlator is analyzed to locate troughs or peaks in the output of the at least one correlator, and wherein the number of troughs or peaks needed to pass a threshold to indicate that the respective preamble has been identified varies as a function of the magnitude of the troughs or peaks.

24. The device of claim 22, wherein the receiver receives the data packet via a received radio frequency signal, and wherein the receiver determines an offset between a frequency of the received radio frequency signal and a nominal frequency of the device.

25. The device of claim 24, wherein the receiver determines the offset between the frequency of the received radio frequency signal and the nominal frequency of the device concurrently with performing the receiver gain adjustment.

26. A device configured to receive wireless signals, the device comprising:
means for receiving a radio frequency signal comprising at least a preamble of a data. packet;
means for adjusting a radio frequency amplifier gain based on a magnitude of the preamble of the data packet, the adjusting beginning prior to receipt of the preamble of the data packet;
means for identifying the preamble of the radio frequency signal, wherein the adjusting the radio frequency amplifier gain only completes once the preamble is identified.

27. The device of claim 26, further comprising:
means for performing a receiver frequency adjustment with respect to the radio frequency signal, the receiver frequency adjustment performed in parallel with the adjusting of the radio frequency amplifier gain.

28. The device of claim 27, further comprising means for performing timing synchronization for the radio frequency signal to control bit recovery from the data packet, the timing synchronization performed in parallel with the receiver frequency adjustment and the adjusting of the radio frequency amplifier gain.

29. The device of claim 26, wherein the means for identifying the preamble comprises correlator means for detecting one or more portions of the preamble.

30. The device of claim 26, wherein the correlator means comprise a first correlator means for detecting a first portion of the preamble and a second correlator means for detecting a second portion of the preamble, the first and the second correlator means operating in parallel.

31. The device of claim 26, further comprising means for performing an energy detect, the energy detect used to verify identification of the preamble.

* * * * *